(12) United States Patent
Storm et al.

(10) Patent No.: US 11,989,275 B2
(45) Date of Patent: *May 21, 2024

(54) PASSIVE IDENTIFICATION OF A DEVICE USER

(71) Applicant: Jumio Corporation, Sunnyvale, CA (US)

(72) Inventors: Gregory Lee Storm, Parkville, MO (US); Reza R. Derakhshani, Shawnee, KS (US)

(73) Assignee: Jumio Corporation, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/309,661

(22) Filed: Apr. 28, 2023

(65) Prior Publication Data

US 2023/0273986 A1 Aug. 31, 2023

Related U.S. Application Data

(63) Continuation of application No. 16/241,508, filed on Jan. 7, 2019, now Pat. No. 11,675,883.

(51) Int. Cl.
*G06F 21/00* (2013.01)
*G06F 21/32* (2013.01)
(Continued)

(52) U.S. Cl.
CPC ............ *G06F 21/32* (2013.01); *G06V 10/764* (2022.01); *G06V 10/82* (2022.01); *G06V 40/103* (2022.01);
(Continued)

(58) Field of Classification Search
CPC ..... G06F 21/32; G06F 3/0488; G06V 10/764; G06V 10/82; G06V 40/103; G06V 40/12;
(Continued)

(56) References Cited

U.S. PATENT DOCUMENTS 10,438,200 B1 10/2019 Griffith et al.
11,010,737 B1 5/2021 Hill
(Continued)

*Primary Examiner* — Brandon Hoffman
*Assistant Examiner* — William A Corum, Jr.
(74) *Attorney, Agent, or Firm* — Patent Law Works LLP; Reena Kuyper

(57) ABSTRACT

Methods, systems, and apparatus, including computer programs encoded on a computer storage medium, for a biometric authentication system. In one aspect, a method includes identifying a target user in proximity to a kiosk. Data for the target user is gathered from equipment on and in proximity to the kiosk. The gathered data is processed to generate a feature vector. The feature vector includes at least motion characteristics of the target user as the target user approaches the kiosk and touch input characteristics of the target user at the kiosk. A candidate user to compare to the target user is determined. Reference data for the candidate user is retrieved. The feature vector is compared to the reference data for the candidate user to determine a likelihood that the target user is the candidate user. A kiosk application is customized for the target user based on the determined likelihood.

20 Claims, 8 Drawing Sheets

(51) Int. Cl.
*G06V 10/764* (2022.01)
*G06V 10/82* (2022.01)
*G06V 40/10* (2022.01)
*G06V 40/12* (2022.01)
*G06V 40/16* (2022.01)
*G06V 40/18* (2022.01)
*G06V 40/20* (2022.01)
*G06V 40/70* (2022.01)

(52) U.S. Cl.
CPC ............ *G06V 40/12* (2022.01); *G06V 40/171* (2022.01); *G06V 40/172* (2022.01); *G06V 40/18* (2022.01); *G06V 40/20* (2022.01); *G06V 40/25* (2022.01); *G06V 40/70* (2022.01)

(58) Field of Classification Search
CPC .... G06V 40/171; G06V 40/172; G06V 40/18; G06V 40/20; G06V 40/25; G06V 40/70
See application file for complete search history.

(56) References Cited

U.S. PATENT DOCUMENTS

| | | |
|---|---|---|
| 2008/0158222 A1 | 7/2008 | Li et al. |
| 2015/0373050 A1 | 12/2015 | Dayan |
| 2016/0072915 A1 | 3/2016 | Decanne |
| 2016/0275518 A1 | 9/2016 | Bowles |
| 2017/0354349 A1* | 12/2017 | Mohapatra ........... A61B 5/7203 |
| 2017/0374210 A1 | 12/2017 | Channa |
| 2018/0288040 A1 | 10/2018 | Kursun et al. |
| 2019/0163985 A1 | 5/2019 | Wang et al. |
| 2019/0164165 A1 | 5/2019 | Ithabathula |
| 2019/0187265 A1 | 6/2019 | Barbello |
| 2019/0213857 A1 | 7/2019 | Ghourchian |
| 2020/0034819 A1 | 1/2020 | Melo et al. |
| 2020/0084040 A1 | 3/2020 | Fish et al. |
| 2020/0202117 A1 | 6/2020 | Wu |
| 2021/0350346 A1 | 11/2021 | Edwards et al. |

* cited by examiner

PASSIVE IDENTIFICATION OF A DEVICE USER

CROSS-REFERENCE TO RELATED APPLICATIONS

The present application is a continuation of U.S. patent application Ser. No. 16/241,508, titled "Passive Identification of a Device User," and filed on Jan. 7, 2019, the contents of which are hereby incorporated by reference in their entirety.

TECHNICAL FIELD

This specification generally relates to biometric authentication of a user using a feature vector.

BACKGROUND

Biometrics allows a person to be identified and authenticated based on a set of recognizable and verifiable data, which are unique and specific to them. Biometric authentication includes the process of comparing data for a person's characteristics to that person's biometric "template" to determine resemblance. Biometric authentication systems can be grouped based on the physical characteristic employed to authenticate users. Examples of such systems include authentication based on fingerprints, hand geometry, palm veins, retina scans, iris scans, facial recognition, signatures, and voice analysis.

SUMMARY

Implementations of the present disclosure are generally directed to a biometric authentication system deployed via kiosk type devices. An integrated biometric authentication method can use multiple sensors (e.g., "internet of things" sensors) deployed on or around a kiosk device to authenticate and/or confirm an identify of a user of the kiosk device. The biometric authentication method can be used to passively identify a user of a kiosk device (or other "self-service" devices) based on a user's interaction with the kiosk device and the user's activity within the vicinity of the kiosk device. The sensors can capture a vector of features for the user, including, for example, a facial image or other images, gait characteristics, touch-input characteristics of touch gestures made on the kiosk device, and an effect of the user on one or more wireless signals emitted in an area in which the kiosk device is deployed.

The vector of features can be compared to reference data obtained for one or more identified candidate users. A candidate user can be identified based on an inputted or retrieved user identifier, or based on an initial identification of the user based on a portion of the vector of features. A likelihood that the user is the candidate user can be determined, and a kiosk application can be customized based on the determined likelihood. For example, if the likelihood that the user is the candidate user is more than a threshold, the user can be granted access to the kiosk application as the candidate user. If the user does not sufficiently match reference data for any candidate user, the user can be denied access to the kiosk application or may be directed to provide additional authentication information.

In a general implementation, systems, apparatus, and methods for authenticating a user at a kiosk device include identifying a target user in proximity to a kiosk. Data for the target user is gathered from equipment on and in proximity to the kiosk. The gathered data is processed to generate a feature vector for the target user. The feature vector includes at least motion characteristics of the target user as the target user approaches the kiosk and touch input characteristics of the target user at the kiosk. A candidate user to compare to the target user is determined. Reference data for the candidate user is retrieved. The feature vector is compared to the reference data for the candidate user to determine a likelihood that the target user is the candidate user. A kiosk application is customized for the target user based on the determined likelihood.

In another general implementation, one or more non-transitory computer-readable storage media coupled to one or more processors and having instructions stored thereon which, when executed by the one or more processors, cause the one or more processors to perform operations that include identifying a target user in proximity to a kiosk. Data for the target user is gathered from equipment on and in proximity to the kiosk. The gathered data is processed to generate a feature vector for the target user. The feature vector includes at least motion characteristics of the target user as the target user approaches the kiosk and touch input characteristics of the target user at the kiosk. A candidate user to compare to the target user is determined. Reference data for the candidate user is retrieved. The feature vector is compared to the reference data for the candidate user to determine a likelihood that the target user is the candidate user. A kiosk application is customized for the target user based on the determined likelihood.

In yet another general implementation, a system includes a camera, at least one transceiver, a server system comprising a data store, and a kiosk device. The kiosk devices comprises a one or more processors and a computer-readable storage device coupled to the one or more processors. The computer-readable storage device has instructions stored thereon which, when executed by the one or more processors, cause the one or more processors to perform operations comprising identifying a target user in proximity to a kiosk. Data for the target user is gathered from equipment on and in proximity to the kiosk. The gathered data is processed to generate a feature vector for the target user. The feature vector includes at least motion characteristics of the target user as the target user approaches the kiosk and touch input characteristics of the target user at the kiosk. A candidate user to compare to the target user is determined. Reference data for the candidate user is retrieved. The feature vector is compared to the reference data for the candidate user to determine a likelihood that the target user is the candidate user. A kiosk application is customized for the target user based on the determined likelihood.

Implementations of the above aspects can include one or more of the following features. The target user can be a user which has not yet been positively identified. The motion characteristics can include gait characteristics of the target user. The motion characteristics can include data that reflects an effect the target user has on a wireless signal. Customizing the kiosk application can include granting access to the kiosk application when the determined likelihood is more than a predetermined threshold. Customizing the kiosk application can include denying access to the kiosk application when the determined likelihood is less than the predetermined threshold. Determining the candidate user can include receiving an identifier of the candidate user. Determining the candidate user can include identifying the candidate user based on a portion of the feature vector.

Particular implementations of the subject matter described in this disclosure can be implemented so as to realize one or more of the following advantages. First, identification of user features before the user actually engages with the kiosk substantially reduces kiosk response time to the user (i.e. the search space is reduced on several orders of magnitude). Second, identifying a user based on multiple features allows much higher accuracy of identification. Third, passively and continuously identifying a user increases security and decreases fraudulent use of a kiosk device.

It is appreciated that methods in accordance with the present disclosure can include any combination of the aspects and features described herein. That is, methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
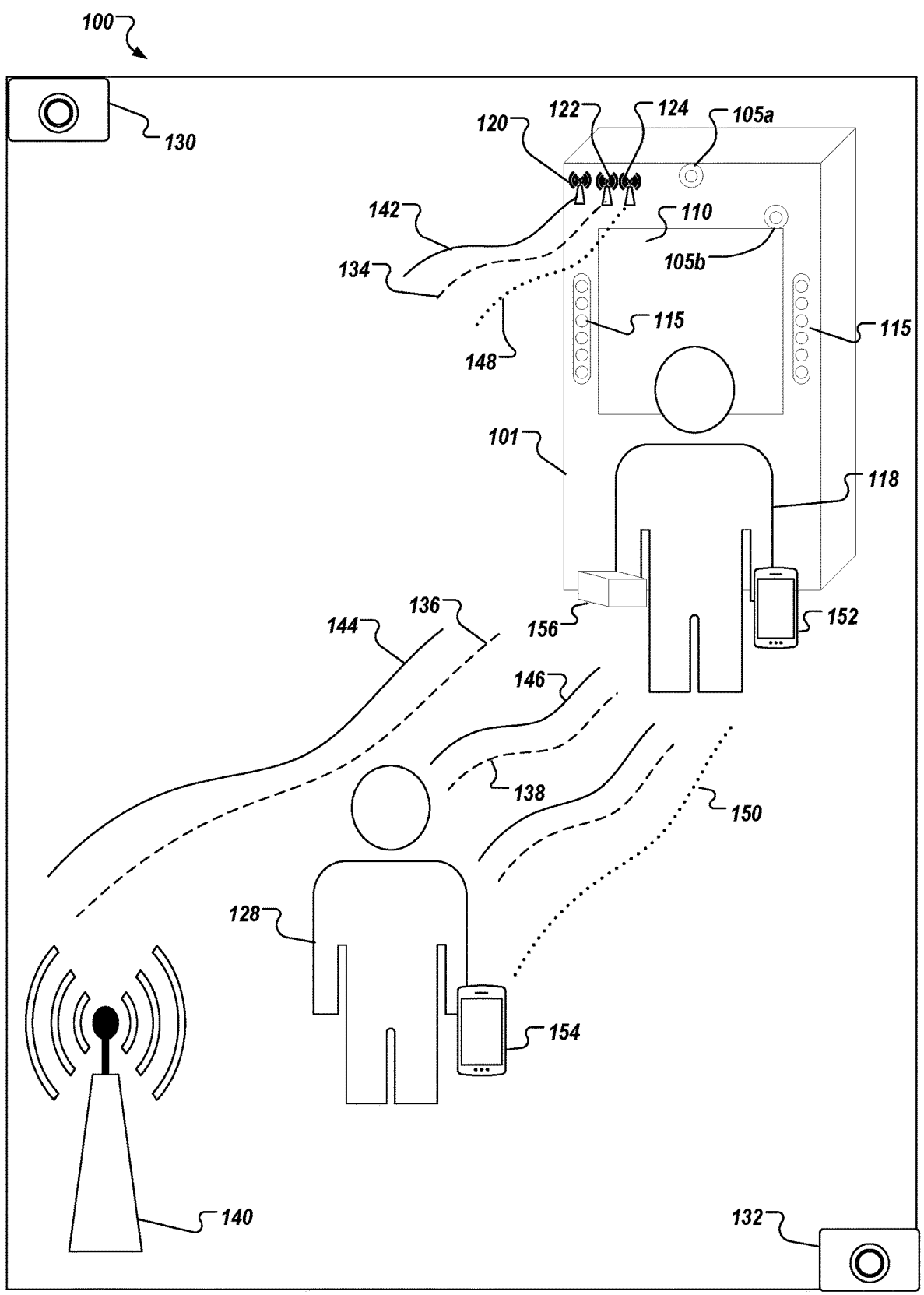
FIG. 1 depicts a kiosk machine in example environments to which a biometric authentication system may deployed.

Implementations of the present disclosure are generally directed to a system deployed to authenticate users at a kiosk type device based on collected biometric data. More particularly, implementations of the present disclosure are directed to a biometric authentication system deployed within a kiosk type device that captures multiple types of biometric data (e.g., a facial image, an eye print, touch and other gestures, gait characteristics, and effect on a wireless signal) as a feature vector for the user that can be compared to baseline or template data to generate a multimodal-biometric score. The feature vector can be employed by the biometric authentication system to authenticate users as they engage with the kiosk. Services, such as collection of payment, withdraw of funds, or purchasing products or services can then be provided (or denied) to the users based on the authentication result.

The disclosure is presented to enable any person skilled in the art to make and use the disclosed subject matter in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described or illustrated implementations, but is to be accorded the widest scope consistent with the principles and features disclosed herein.

In view of the foregoing, and as described in further detail herein, implementations of the present disclosure provide for a biometric authentication system, which can be deployed using, for example, a kiosk type device. Various biometric identification/authentication systems are based on capturing biometric data that can be compared with or analyzed with reference baseline or template data to generate a multimodal-biometric score. Biometric data refers to any computer data that is created during a biometric process. Authentication systems may employ models, templates, images, maps, similarity scores and so forth that are generated based on biometric data/traits collected from/about users, such as prints (e.g., eyeprints, fingerprints, foot prints, palm prints), retinal scans, pressure signatures (e.g., static, dynamic), face scans, gait measures, olfactory biometrics (e.g., odor), and auditory biometrics (e.g., voice prints). As more sensors and additional computing power become available additional identification vectors are being added regularly. All or a subset of the above biometric traits maybe fused to provide a more accurate multimodal-biometric score from the aforesaid signals which can help the primary biometric modality in matching as well as anti-spoofing.

The described biometric authentication system provides multi-fold advantages, such as increased privacy, technical simplicity and feasibility, decreased power consumption, reduced identification search space, extra layers of verification, increases efficiency, reduction in fraud, and better overall scaling.

FIG. 1 depicts an example environment 100 to which a biometric authentication system may deployed. The example environment 100 includes a kiosk device 101. Such kiosk machines may be used for various purposes that require authenticating users via one or more biometric authentication processes. For example, the kiosk 101 can be configured as an ATM that allows a user to withdraw money from a bank account. As another example, the kiosk 101 may configured as a payment/ordering machine in a restaurant or store.

The kiosk 101 includes one or more components that support a biometric authentication system. As depicted, the kiosk 101 includes cameras 105*a* and 105*b*, a display 110, and illumination sources 115. As described below, the kiosk 101 can include one or more transceivers or transmitters. Other configurations of the kiosk 101 may include other types of components depending to the configured purpose. For example, the kiosk 101 may include one or more microphones, an RFID (Radio Frequency Identification) reader, or other equipment.

In some implementations, the display 110 displays information to a user 118. The display 110 may also be used by the user 118 to interact with the kiosk 118. For example, the display 110 may be a capacitive touch screen displaying a graphical user interface (GUI) through which the user 118 can enter and receive data. For example, a GUI can be displayed and interacted with by users on the display 110.

The cameras 105*a* and 105*b* can be employed to capture images of the users who are interacting with the kiosk 101. In some implementations, multiple cameras may be used. For example, the camera 105*a* can capture a user's face and the camera 105*b* can capture gestures the user 118 makes while interacting with the display 110. The illumination sources 115 may be employed to generate electromagnetic radiation as the cameras 105*a* and 105*b* capture image data.

In some examples, the captured image(s) can be included in user features that are processed to identify/authenticate users, and/or permit or deny access to the services/products being offered through the kiosk 101.

The kiosk 101 can include a WiFi (Wireless Fidelity) transceiver 120 (e.g., a WiFi router) for broadcasting and receiving wireless signals, a radar transceiver 122 (e.g., a millimeter radar emitter/receiver) for broadcasting and receiving radar signals, and a Bluetooth transceiver 124, for broadcasting and receiving Bluetooth signals. Although described as transceivers, the kiosk can include transmitters and/or transmitter-receivers.

A transceiver is an electronic device comprising both a transmitter and a receiver that may be combined and share common circuitry or a single housing. A transmitter produces, for example, radio waves with an antenna. A transceiver may generate a radio frequency alternating current, which is applied to the antenna. When excited by this alternating current, the antenna radiates radio waves. A receiver is an electronic device that receives radio waves and converts the information carried by them to a usable form.

A target user of the kiosk 101 can be identified. In some implementations, a target user can be an individual, such the user 118, who has begun interacting with the kiosk 101 but who has not yet been positively identified. The user 118 can be identified as a target user, for example, upon the user 118 touching and interacting with the display 110 or upon being in view of the camera 105a or the camera 105b.

In some implementations, a target user can be an individual who is in the vicinity of the kiosk 101 who has not yet been positively identified. For example, a user 128 can be identified as a target user based on detection of the user 128 as the user 128 approaches the kiosk 101. Although shown separately, the user 118 and the user 128 may be the same user, e.g., at different points in time. Security cameras 130 and 132 near the kiosk 101 and/or the camera 105a can, for example, capture images and/or video of the user 128 as the user approaches the kiosk 101.

As another example, one or more of the WiFi transceiver 120, the radar transceiver 122, or the Bluetooth transceiver 124 can detect the presence of the user 128 as the user approaches the kiosk 101. For instance, the radar transceiver 122 can detect the presence of the user 128 near the kiosk 101, based on analyzing collected radar data obtained, e.g., from radar signals 134, 136, and 138. Alternatively or additionally, the WiFi transceiver 120 can be configured to be in communication with a WiFi receiver 140 that is external to the kiosk 101 (e.g., the WiFi transceiver 140 may be across a room from the kiosk 101). The WiFi transceiver 120 can send wireless signals (e.g., wireless signals 142, 144, and 146) to the WiFi transceiver 140. The presence of the user 128 can block or deflect some of the wireless signals sent from the WiFi transceiver 120 (e.g., due to water inside of the user's body), enabling identification of the user 128 as a target user based on the signal blocking or deflection. The WiFi transceiver 140 can send information about received signals back to the WiFi transceiver 120, thereby creating a "WiFi radar" system. Once a user has been identified using the radar transceiver 122 or the WiFi transceiver 120, the location of the user can be tracked by processing subsequently-received radar information.

As another example, the Bluetooth transceiver 124 can comprise a Bluetooth beacon. Bluetooth beacons are hardware transmitters. More specifically Bluetooth beacons include a class of BLE (Bluetooth Low Energy) devices. Bluetooth beacons may employ BLE proximity sensing to transmit (e.g., as illustrated by signals 148 and 150) a universally unique identifier (e.g., a kiosk identifier) that can be picked up by a compatible application and/or operating system (e.g., developed with Eddystone or iBeacon). Bluetooth beacons differ from some other location-based technologies as the broadcasting device (beacon) may be implemented as a one-way transmitter to receiving devices, such as mobile devices 152 or 154 of the user 118 or 128, respectively, and may necessitate a specific application installed on a receiving device to, for example, interact with the beacons or designated back-end service. This ensures that only the installed application (and not the Bluetooth beacon transmitter) can track users, potentially against their will, as they passively walk around the transmitters. Bluetooth beacon transmitters come in a variety of form factors, including small coin cell devices, Universal Serial Bus (USB) sticks, and generic Bluetooth 4.0 capable USB dongles. As an example, a BLE signal broadcast from a Bluetooth transmitter or transceiver may include a kiosk identifier.

Nearby mobile devices be configured to perform actions when a BLE signal from the kiosk 101 is received. For example, the mobile devices 138 and 140 may be programmed to establish a wireless connection with the kiosk 101 when the BLE signal is received (e.g., by sending a BLE beacon "ping" message to the kiosk 101). While wirelessly connected to the kiosk 101, the mobile devices 138 and 140 can share BLE information with the kiosk 101, which can be used to track the location of the user 118 or 128, respectively.

Data other than location data can be gathered for a target user after the target user has been identified. For instance, in addition to location, some or all of the WiFi transceiver 120, the radar transceiver 122, or the Bluetooth transceiver 124 can track a target user's direction of travel and speed. In general, any signal characteristics that are specific to the target user that are obtained from the WiFi transceiver 120, the radar transceiver 122, or the Bluetooth transceiver 124 can be gathered and associated with the target user.

For instance, each target user may have a unique effect on a radar or other wireless signal, or may have a particular movement pattern (both within and through space) that is captured by a respective transceiver. Wireless signal characteristics captured at a particular point in time can create data that is like an x-ray for a user. For instance, received wireless signal characteristics can reflect a deflection effect that the user 128 had on the signals 146 and 138. The effect of the user 128 on some of the wireless signals transmitted by the kiosk 101 can create an "apparition" in signal data that is received back at the kiosk 101. Each user may have a unique apparition/effect. In some implementations, wireless signal effects can be gathered for a user in rooms other than the room that includes the kiosk 101, since wireless signals can be transmitted, and their effects measured, through walls.

Other examples of data gathering include microphone(s) in or near the kiosk 101 capturing audio, with the audio being associated with a given target user, based on a user's known location. The audio can include a target user's voice and/or a target user's footsteps, for example. As another example, the security cameras 130 and 132, and the cameras 105a and 105b can capture (or continue to capture) video and/or images of the target user after the target user has been identified.

In some implementations, the mobile device 152 or 154 (or another mobile device of a user, such as a wearable device) is tracking data (e.g., health data, such as heart rate) for the user 118 or 128, respectively. The mobile device 152 and 154 can be configured to provide user data for the user 118 or 128, respectively, to the kiosk 101, in response to receiving BLE signal from the Bluetooth receiver 124.

Once a target user starts interacting with the kiosk 101, other types of data can be captured and associated with the target user. For instance, touch input data for the user 118 can be captured as the user interacts with the display 110. For instance, touch location, area, pressure/force, direction, and duration can be captured. The camera 105b can capture video that records, e.g., arm gestures that the user 118 makes while interacting with the display 110. The arm gestures can be made during, between, or after touch inputs, for example.

The kiosk 101 can be configured to request certain data for a target user as part of an authentication process. For instance, the target user may be prompted to enter a phone number, make a certain gesture pattern, say certain word(s), or look at a camera. Entered input, touch input, and video or image data captured during the authentication process can be gathered and associated with the target user (for subsequent use in later steps of the authentication process).

In some implementations, the kiosk 101 includes a RFID reader. The RFID reader can receive information from a RFID tag that is on a product 156 that has been selected and is carried by the user 118, for example. A product identifier of the product 156 can be associated with the target user, as an indication of a type of product that the target user may be interested in purchasing.

After data has been gathered for a target user, a feature vector for the target user can be generated that includes multiple user features. The feature vector can include motion characteristics of the target user, touch-input characteristics, and other features. The features can include gathered data, such as radar data, and processed data that is generated as a result of processing the gathered data (e.g., a user's gait characteristics can be determined from video, wireless signal data, etc.). As another example, some features can be composite features that indicate, for example, a correlation between two or more other features. Each feature can represent user characteristics that are reflected in or obtained from gathered data, which may be useful for identifying a target user or reducing a search space for target user identification.

Captured video and/or images can be processed to generate target user features. For example, an image captured by the camera 105a can be processed to generate facial characteristics, a facial snapshot, an eye print, or other data. For instance, the kiosk 101 may extract from captured images, various features, such as features derived from the face, iris, vasculature underlying the sclera of the eye, or the periocular region. As another example, video captured by the camera 105a can be processed to detect facial expressions. Video captured by the camera 105b can be processed to identify gestures (e.g., arm gestures) or gesture patterns that a target user makes while interacting with the kiosk 101. For example, the target user may lift and move their hand in a particular way between touch gestures. As described in more detail below, captured video (from some or all of the security cameras 130 and 132 and the cameras 105a and 105b) can be processed to identify gait or other motion characteristics of the target user.

Location data obtained from wireless signals can be processed to determine, for example, a target user's pace of movement. Data that indicates a user effect on radar or wireless signals can be processed to generate a series of data that is indexed by time and that represents a target user's movement through space. The way a target user walks can effect a radar signal, for example, and the series of data can represent the user's effect on the radar signal over time. As described in more detail below, radar and wireless signal data can be used to determine or confirm more specific target user features, such as gait characteristics.

Features for the target user can be generated based on audio captured by microphones on or near the kiosk 101. For instance, audio of a target user's footsteps can be processed to identify a pace of walking. The foot step audio itself can be a feature, since each target user may have a particular walking cadence. If the kiosk 101 has requested the user to speak as part of an authentication process, the audio spoken in response to the request can be a feature, as can a voice to text translation of the audio. If captured audio includes other voice input captured while the user is in the vicinity of the kiosk 101, that voice input can be identified in the audio and associated with the user as another feature.

Touch data for the user can be processed to generate touch-characteristic features. Each target user may have particular touch characteristics in the way that they interact with the display 110, such as how they swipe, tap, press, make certain characters, pause between movements, how hard they press, etc. Other identifying touch-characteristic features can include which hand or digit(s) a user typically makes for certain gestures, movement arcs, swirls, and other patterns of movement when making certain touch inputs, etc. The generation and use of touch-input features is described in more detail below with respect to FIGS. 4-6.

Video and other gathered data can be analyzed to determine gait and other "large-motion" movements of the target user. Gait analysis features can include foot swing speed, pace of movement, periodicity, length from knee joint to hip joint, and arm-swing movement. Certain gait analysis features, such as a length of a swing of a foot can be fairly unique for each user, due to leg length, position of knee, etc. Security cameras such as the cameras 130 and 132, and other cameras at other points in a space in which the kiosk 101 resides (e.g., other stores, etc.) can capture multiple sets of video for the target user that can be processed using gait analysis. Some gait characteristics can be determined from other types of gathered data, such as radar data or other wireless signal data that reflects effect(s) of a user on wireless signals.

A feature can represent transactional behavior of the target user. For example, a category of the product 156 can be stored in association with context information, such as location, time day, day of week, etc. For instance, some users may make certain types of purchases in certain contexts, and current behavior may be used, in part, to verify a user based on a comparison of the current behavior to reference behavior of candidate users.

Some features can be used to reinforce or aid in generation of other features. For instance, a user's pace of walking or foot-strike periodicity can be determined from video, audio, and wireless signal data. In this example, an overall or average pace feature can be an average of other calculated paces. Gait characteristics, such as rate and size of arm or leg swing can be determined based on calculations made from both captured video and wireless signal data, for example. Other data can be correlated. For example, a user's arm or finger angle when making certain types of touch inputs can be calculated based on correlating video captured by the camera 105b to touch inputs captured by the display 110. As another example, feature(s) of making certain facial expressions while making certain touch inputs can be determined based on correlating video and touch input.

After the feature vector has been generated for the target user, one or more candidate users to compare to the target user can be identified. A candidate user can represent a user or a user profile that is to be compared to the generated feature vector, to determine whether the target user is a same user as the candidate user, based on a degree of match between the real-time generated feature vector of the target user and reference data obtained for the candidate user. A candidate user can be identified based on the kiosk 101 obtaining a user identifier for the target user. For example, the target user (e.g., the user 118) can enter or provide identifying information to the kiosk 101 (e.g., as part of a login or authentication process, or as a result of performing a transaction with the kiosk 101). As another example, a user identifier for the target user can be obtained from a mobile device of the target user.

For example, when the mobile device 138 or 140 receives a BLE signal from the Bluetooth transceiver 124, it may be configured to provide (through, for example, an application) the kiosk identifier, an identifier of a respective mobile device, and characteristics regarding the received BLE signal (e.g., signal strength, elapsed time, directional data, and so forth) to a back-end service. The back-end service can, in response to receiving that data from a mobile device, provide the user identifier of the mobile device (and in some implementations, reference data from a user profile associated with the user identifier) to the kiosk 101. In alternative implementations, the mobile device may be programmed to establish a wireless connection with kiosk 101 when the BLE signal is received. In such implementations, the mobile device may provide the user identifier to the kiosk 101.

In implementations or situations in which a user identifier of the target user has not been received or determined by the kiosk 101, an identity of a candidate user can be determined or predicted based on a subset of the features determined for the target user. For instance, one or more features that may be first checked for user identification can be predetermined, based on each feature being likely to be useful (or efficient) for determining a candidate user that may match the generated feature at a sufficient level of confidence. For instance, a candidate user can be identified by comparing extracted facial feature(s) to one or more template user images (e.g., images provided by users during enrollment processes or during other uses of kiosk devices). The kiosk 101 can send the facial features to a backend server, for comparison by the server of the facial features to the template images. As another example, the kiosk 101 can compare the facial features for the target user to template images that are stored (and periodically updated) on the kiosk 101. If the facial features of the target user sufficiently match a particular template image, a user associated with the template image can be identified as a candidate user, for further authentication (e.g., to confirm or reinforce a tentative authorization determined based on the facial feature comparison).

Once a candidate user has been identified, reference data (or additional reference data, if some feature(s) have been used for an initial identification) can be obtained or identified for the candidate user. Similar to the description above for facial features, other reference data can be obtained by the kiosk 101 from a backend server. As another example, the kiosk 101 can send the feature vector to the backend server and the backend server can identify reference data corresponding to each feature in the feature vector.

The kiosk 101 or the backend server can compare each feature in the feature vector to corresponding reference data for the candidate user. A match score for each feature in the feature vector can be determined, based on a degree of match between the feature and the corresponding reference data. An overall match score can be determined that represents a likelihood that the target user is the candidate user, based on the degrees of match for the features in the feature vector. Various approaches can be used to determine the overall match score. For example, each degree of match can be a percentage match and the overall score can be an average percentage match that is an average of the respective percentage matches. As another example, the overall match score can be a Boolean True or False value, with the overall match score being True if, for example, at least one or at least a certain number of features have a match score that is at least a threshold amount (e.g., the overall match score can be True if at least three features have a match score of at least 90%). In some implementations, some features can have a higher weight than other features, and a feature-specific match score can be multiplied by the feature weight before being factored into an aggregated overall match score.

A kiosk application or use of the kiosk can be customized for the target user based on the determined likelihood that the target user is the candidate user. For example, if the likelihood that the user is the candidate user is more than a threshold, the user can be granted access to the kiosk application as the candidate user. If the likelihood is less than the threshold, the user can be denied access to the kiosk application or can be directed to provide additional authentication information. As another example, the kiosk 101 can be configured to obtain addition data for the user, by asking the user to provide other touch inputs, or to look at the camera 105a for a photo, for generating additional features for the user for additional comparisons to reference data (for determining whether the additional features sufficiently match reference data of a candidate user). In some implementations, the kiosk 101 is configured to prompt the user to provide identifying information (which may be additional identifying information than that already obtained by the kiosk 101).

In some implementations, different types of uses of the kiosk 101 may require higher confidence levels that the target user is a particular candidate user. For example, if the target user is attempting to use the kiosk to purchase an item less than $1, the kiosk 101 can be configured to allow the transaction if the likelihood that the target user is the candidate user is at least 95%. However, as another example, if the potential transaction has an amount that is more than $100, for example, the kiosk 101 may be configured to allow the transaction if the likelihood that the target user is the candidate user is at least 99%.

If the kiosk 101 has accepted that the candidate user is the target user, the feature vector determined for the target user can be stored as new reference data for the candidate user, and the new reference data can be used for future authentication sessions for the candidate user. In some implementations, data is gathered for the user after the user has been positively identified. For instance, the user may perform multiple transactions, using other touch inputs for subsequent transactions. As another example, additional video of the user may be captured as the user walks away from the kiosk 101. Additional data/features identified for the user after the user has been identified can be stored as updated reference data for the user.

Updating reference data for a user can be a part of a machine-learning process deployed by the biometric authentication system. The machine learning process can be implemented, for example, using a deep neural network architecture. In some implementations, the machine-learning process may be implemented, at least in part, using one or more processing devices deployed on the kiosk 101. In some implementations, the kiosk 101 may communicate with one or more remote processing devices (e.g., one or more remote servers) that implement the machine learning process (see FIG. 2).

In some implementations, additional user authentication checks are performed for the user, after new data is gathered while the user continues to use or be in the vicinity of the kiosk 101. Accordingly, a continuous identity authentication/verification approach can be performed. Implementing a continuous identity authentication/verification can provide for improved security for an individual when interacting with a kiosk device. By continuously authenticating/verifying user identity, fraud and unauthorized access and utilization of particular services can be prevented.

The feature vector can be used to passively identify a user. For instance, passive identification can be achieved if features obtained as a user approaches the kiosk 101 and other passively-obtained data (e.g., images) match a candidate user at a high degree of confidence. The kiosk 101 may sufficiently identify a user without requiring a user to enter identifying information, for example. In some authentication/verification systems, verifying an individual's identity interrupts a user's experience and can take a relative long amount of time to authenticate/verify identity. Accordingly, a system in which identity authentication/verification is passive and continuous can reduce interference of the user's experience. Implementing a system and method that runs in the background of a kiosk device and provides for continuous identity authentication/verification allows for improved security for transactions performed on the kiosk device.

The feature vector can be used to reduce a search space of candidate users. For instance, passively-obtained data may not sufficiently match a particular candidate user, but the pool of candidate users may be reduced by matching passively-gathered data for a user to reference data of candidate users. For instance, the kiosk 101 can analyze the gait of a target user as the user approaches the kiosk 101, and determine that the gait characteristics of the target user are sufficiently different from 90% of users that those 90% of users can be ruled out as candidate users (e.g., leaving 10% of users who may, based on gait analysis, be the target user). Search space reduction can be chained, as other features are generated. For example, if the search space has been reduced by 90%, as described above, the remaining 10% of users can be reduced further by comparing touch input characteristics for the user, as the user begins interacting with the kiosk, to touch characteristics of the remaining 10% of users who have not yet been filtered out of consideration. Search space reduction can continue until one candidate user remains.

As another example, feature matches that remaining candidate users have, as the search space is reduced, can reinforce an authentication, even if the set of candidate users has multiple users and the kiosk requests user identifying information from the target user to finalized authorization. For instance, a final search space may have ten users remaining, after all features (other than user identifiers) have been gathered. The kiosk 101 can request a user identifier from the user, and confirm that the user associated with the user identifier is in the set of ten remaining users in the search space.

Figure 2:
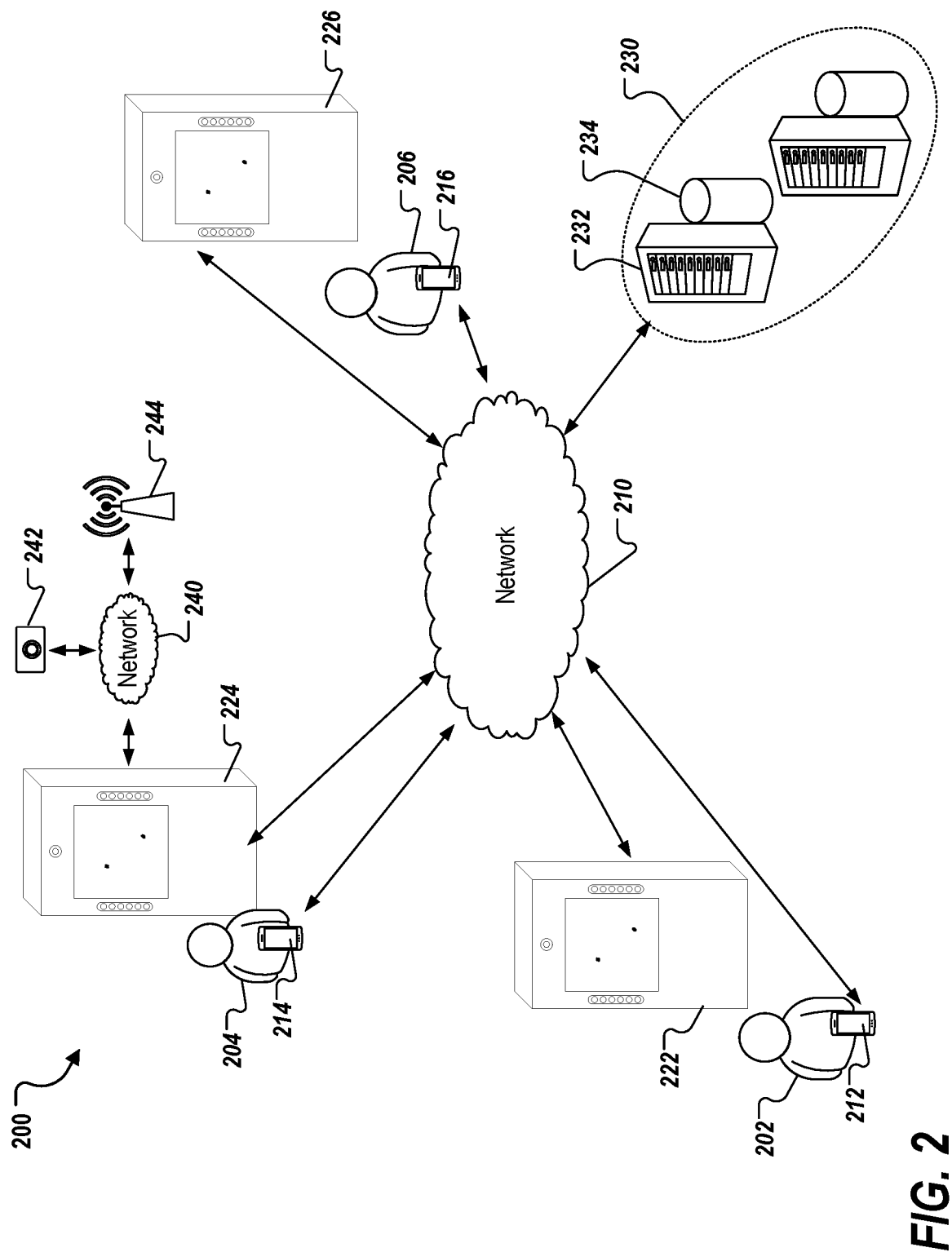
FIG. 2 depicts an example environment that can be employed to multiple instances of a biometric authentication system.

FIG. 2 depicts an example environment 200 that can be employed to execute and/or coordinate multiple instances of the described biometric authentication system. The example environment 200 includes network 210, a back-end system 230, mobile devices 212-216, and kiosk devices 222-226. The kiosk devices 222-226 are substantially similar to the kiosk device 101 depicted in of FIG. 1.

In some implementations, the network 210 includes a local area network (LAN), wide area network (WAN), the Internet, or a combination thereof, and connects computing devices (e.g., the kiosk devices 222-226) and back-end systems (e.g., the back-end system 230). In some implementations, the network 210 can be accessed over a wired and/or a wireless communications link.

In the depicted example, the back-end system 230 includes at least one server system 232 and a data store 234. In some implementations, the back-end system 230 provides access to one or more computer-implemented services with which the kiosks 222-226 and mobile devices 212-216 may interact. The computer-implemented services may be hosted on, for example, the at least one server system 232 and the data store 234. The computer-implemented services may include, for example, an authentication service that may be used by the kiosks 222-226 to authenticate a user based on collected user features.

The server system 232 may receive a request for reference data for a user, from one of the kiosks 222-226. As another example, as part of a biometric authentication service, the server system 232 may receive a unique identifier for one of the kiosks 222-226 and a user associated with the mobile device, such as users 202-206, through an API call initiated from one of the mobile devices 212-216 when the mobile device receives a BLE signal from the kiosk (or respective light house beacon). The server system 232 may then provide the reference biometric templates for the user to the respective kiosk for user authentication.

The respective kiosk can compare the received reference data to a feature vector gathered in real time for a user. The feature vector can be gathered using various sensors or equipment located on or around the kiosk. The kiosk may participate in one or more local networks. For example, the kiosk 224 participates in a local network 240 to communicate with a local security camera system 242 and a wireless transceiver 244 that is external to the kiosk 224.

In some implementations, the server system 232 may retrieve the reference templates for a user from data store 234. This information (e.g., the unique identifier and/or the reference templates) can be provided to a kiosk. The kiosk may then load the received information into active memory for comparison to real-time user feature data obtained by the respective kiosk. In some implementations, the data may have a timeout value and be pulled from active memory based on the timeout value and/or when a user is matched to the retrieved template data.

In some implementations, the back-end system 230 includes computer systems employing clustered computers and components to act as a single pool of seamless resources when accessed through the network 210. For example, such implementations may be used in data center, cloud computing, storage area network (SAN), and network attached storage (NAS) applications. In some implementations, the back-end system 230 is deployed and provides computer-implemented services through a virtual machine(s).

Figure 3:
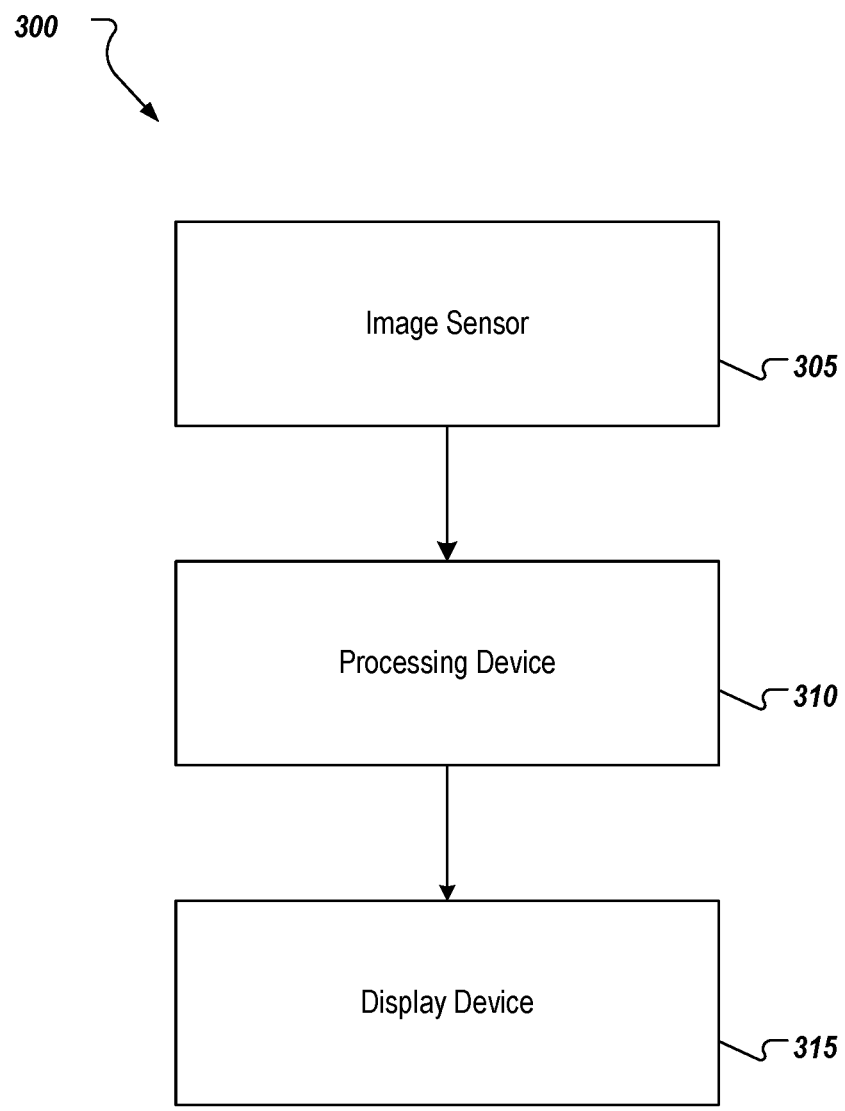
FIG. 3 depicts a system that can be used to implement the technology described herein.

FIG. 3 depicts a system 300 that can be used to implement the technology described herein. The system 300 includes image sensor 305, a processing device 310, and a display device 315. In come implementations, the system 300 may be included within a kiosk, such as described with reference to FIG. 1. For example, the display device 315 can be the display device 110 and the image sensor 305 can be a component of the camera 105a, 105b, or 105c. The image sensor 305 detects and conveys the information that constitutes an image. Types of image sensors include, for example, complementary metal-oxide-semiconductor (CMOS) and charge-coupled devices (CCD). Outputs from an image sensor 305 can be processed using one or more processing devices 310. In some implementations, the output of the one or more processing devices 310 may be used to drive a display device 315. The one or more processing devices 310 can be configured to process the outputs from the image sensor 305 in various ways. In some implementations, the one or more processors 310 are configured to implement a photometric stereo reconstruction process to generate a 3D representation of the subject.

Figure 4:
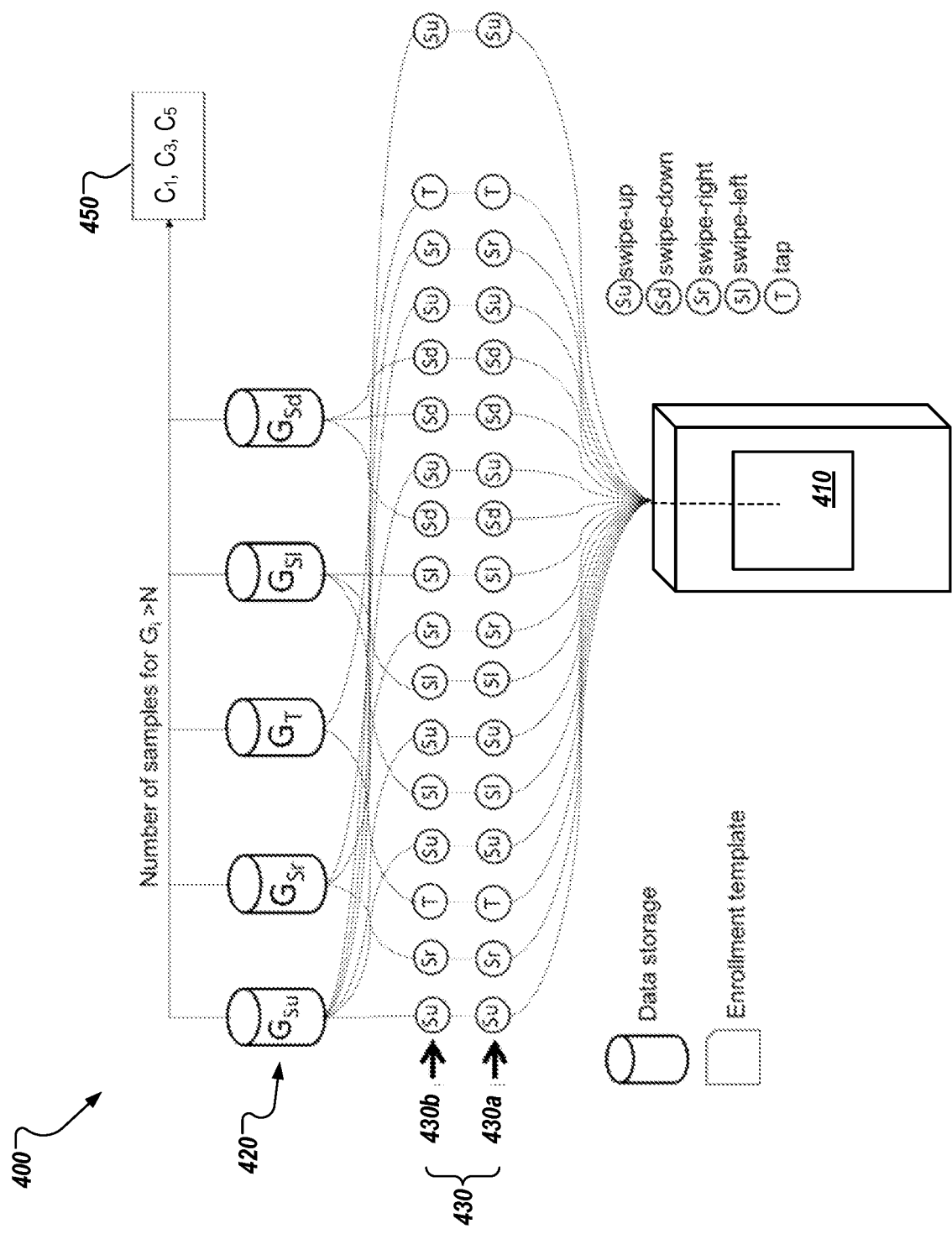
FIG. 4 depicts an enrollment system that can be used to generate an enrollment template for touch input for a user.

FIG. 4 depicts an enrollment system 400 that can be used to generate an enrollment template for touch input for a user. For example, while an individual is interacting with a kiosk, touch data associated with the individual's interaction can be captured, collected, and stored in the background. Capturing and collecting gesture information associated with touch data can provide for a rich set of training data, since the individual's gestures and gesture patterns can be provided in a relatively unconstrained setting.

Identity of an individual may be verified, at least in part, using a touch-input feature that is created by monitoring and making use of gestures unique to the individual. A touch-input feature for a user may be based on the user's touch data input to a touch screen of a kiosk device, which includes touch data comprising signals from touch screen sensors of the kiosk device, in which the signals indicate finger location and pressure exerted on a touch screen while gestures are input to the kiosk device. Gestures include motions made while contact is made with the touch screen sensors of the kiosk device, which include swipes, taps, etc. Gesture patterns can include a collection or series of individual gestures.

Generating a touch-input feature can include capturing, collecting, and storing gesture data input to a touch screen of a kiosk device, and comparing and analyzing authentication gesture data with aspects of reference gesture data. In further detail, generating the touch-input feature for a user can include receiving current gesture data corresponding to one or more gestures received from the user on a touch screen of a kiosk device, generating specific features extracted from the one more gestures, and comparing the specific features with reference gesture information. The reference gesture information can include gesture data collected on the kiosk device (or another kiosk device) from previous interactions of the user with kiosk device(s). In some implementations, the reference gesture information is an enrollment template (unique user profile). The touch-input feature can represent a closeness of match of the current gesture data to the reference gesture information. The uniqueness of the individual's gestures as represented in an enrollment template may be updated based on the individual's gestures changing over time and space.

In FIG. 4, the enrollment system 400 includes processing of gesture data 420 received as input on a kiosk display device 410. In some implementations, various types of gestures 420a and 420b may be received on the kiosk display device 410. For example, the kiosk display device 410 can be a touch screen and the gestures 420a and 420b may be received on the touch screen, and include gestures, such as swipe-up Su, swipe-down Sd, swipe-right Sr, swipe-left Sl, and tap T.

In some implementations, each of the gestures swipe-up Su, swipe-down Sd, swipe-right Sr, swipe-left Sl, and tap T may include touch data $T_D$. For example, for the gesture swipe-up Su, touch data $T_{DSu}$ may be included with the gesture data 420. The touch data $T_{DSu}$ may include a time tin which the gesture data 420 was received on the kiosk display device 410, x-axis and y-axis coordinates of a pixel location on the touch screen of the kiosk display device 410 where the gestures 420a and 420b were received, a force or pressure p received on the touch screen where gestures 420a and 420b were received, and an area/size s of the gesture when it was received on the touch screen. Other touch data that can be gathered and processed includes touch duration and a determined direction of a touch motion.

The enrollment system 400 may capture, collect, and store the gesture data 420 in one or more data storage devices 430. In some implementations, the enrollment system 400 may capture, collect and store the gesture data 420 in accordance with a gesture category. For example, the enrollment system 400 may capture, collect, and store the gesture data 420 based a gesture type G. In some implementations, different types of gestures G from the gesture data 420 may be captured, collected, and stored in the data storage devices 430. For example, data storage device $G_{Su}$ may collect and store gesture data for swipe-up gestures Su, data storage device $G_{Sr}$ may collect and store gesture data for swipe-right gestures Sr, data storage device $G_T$ may collect and store gesture data for tap gestures T, data storage device $G_{Sl}$ may collect and store gesture data for swipe-left gestures S, and data storage device $G_{Sd}$ may collect and store gesture data for swipe-down gestures Sd.

The enrollment system 400 may include an enrollment template 450. In some implementations, the enrollment template 450 is a product obtained from processing the gesture data 420 obtained from the kiosk display device 410. For example, the enrollment system 400 can process the gesture data 420 in order to produce the enrollment template 450 as a snap-shot of a user's unique gesturing peculiarities. After generating the enrollment template 450, a user's current gesturing patterns may be compared to the enrollment template 450 to create a feature that can be used to authenticate and verify the user's identity.

The enrollment template 450 includes classifiers $C_G$, with each classifier corresponding to each of the gesture types G. In FIG. 4, classifiers $C_1$, $C_3$, and $C_5$ are stored, indicating that gestures $G_1$, $G_3$, and $G_5$ are one user's unique gesturing peculiarities. For example, $C_1$ can correspond to a classification of a gesture type $G_1$, which can be, for example, associated with a swipe-up gesture Su. $C_3$ can correspond to a classification of a gesture type $G_3$, which can be associated with a swipe-right gesture Sr. $C_5$ can correspond to a classification of a gesture type $G_5$, which can be associated with a tap gesture T. Accordingly, the classifiers $C_1$, $C_3$, and $C_5$ can represent unique gesturing peculiarities for the particular user that are associated with the swipe-up gesture Su, the swipe-right gesture Sr, and the tap gesture T. Based upon the particular user's unique gesturing peculiarities, verification gesture data provided by the particular user during interaction with the kiosk device 410 can be compared to the enrollment template 450 for the particular user to determine whether the verification gesture data is a reasonable match with the enrollment template 450. Conversely, verification gesture data provided by a different user during interaction with the kiosk display device 410 may generally not match the enrollment template 450 for the particular user. Accordingly, an identity of an individual using the kiosk display device 410 can be verified, at least in part, by gesture data, while the individual is interacting with the kiosk display device 410.

Figure 5:
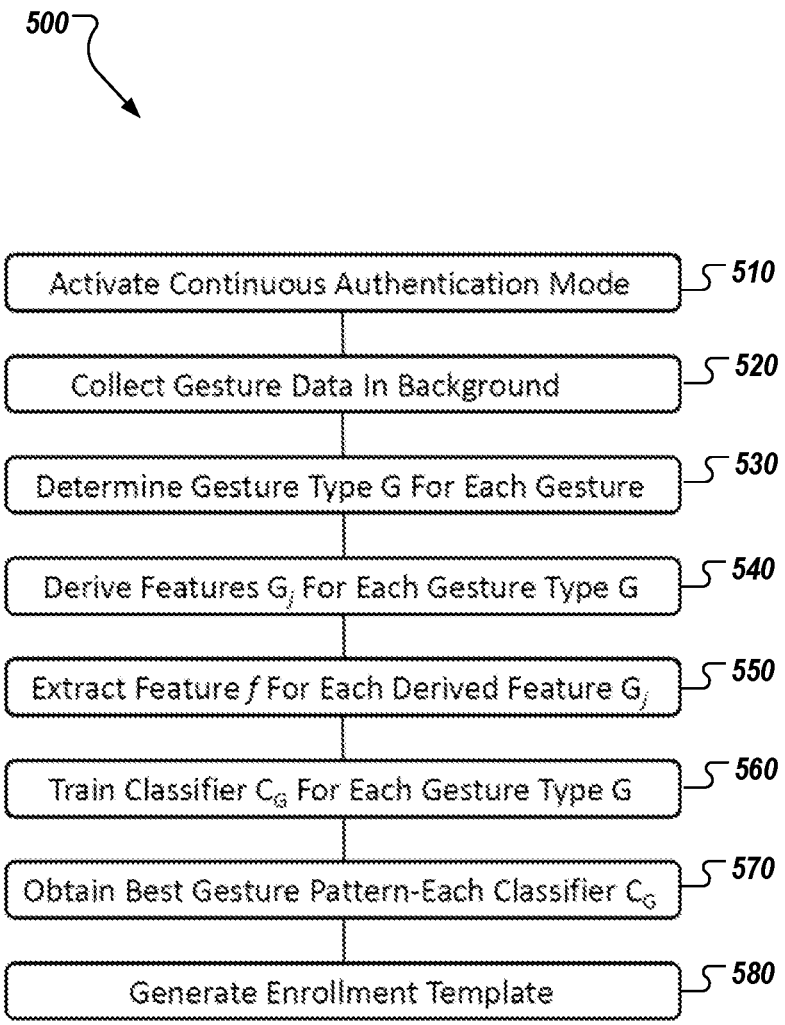
FIG. 5 depicts an exemplary method to implement the system of FIG. 4.

FIG. 5 depicts an exemplary method to implement the system of FIG. 4. In FIG. 5, an enrollment method 500 includes steps to establish an enrollment template, such as the enrollment template 450 depicted in FIG. 4.

Step 510 includes activating a mode for continuous authentication/verification of a user's identity. The mode for continuous authentication of a user's identity can be a default mode for a kiosk device, for example.

Step 520 includes collecting gesture data in the background while a user provides gestures when interacting with a kiosk device. In some implementations, the enrollment method 500 may initiate a software application on the kiosk device to produce a UI in order to receive specific types of gestures. For example, the enrollment method 500 may initiate activation of a game on the kiosk device, in which a UI is produced that requires specific swipe and tap gestures in order to capture, collect, and store a user's unique biophysical interactions with a touch screen of the kiosk device. In this manner, the user's gesture data can be captured, and collected and stored in the background while the user continues interacting with the game.

As another example, the enrollment method 500 may cause the kiosk device to produce a UI requesting different gestures or certain types of input(s) to be input by a user of the kiosk device, and a sequence of requests for inputting the gestures onto the touch screen of the kiosk device. The enrollment method 500 may provide feedback to the user of the kiosk device when the requested gesture input is sufficient and has been accepted, or when the requested gesture input is not sufficient and the particular request for the requested gesture input is again made.

At step 520, the enrollment system 400 depicted in FIG. 4 may be implemented in order to capture, collect, and store an individual's gesture data 420. For example, gesture data associated with swipe-up Su gestures, swipe-down Sd gestures, swipe-right Sr gestures, swipe-left Sl gestures and tap T gestures can be captured, collected, and stored.

Step 530 includes determining a gesture type G for each gesture provided with the gesture data captured in step 520. In some implementations, gesture types can be determined from touch data TD that is provided with the gesture data. For example, receiving location of gestures, force or pressure of the gestures and an area/size of the gestures can be used to determine the gesture type G.

Step 540 includes deriving gesture features $G_j$ for each of the gesture types G determined in Step 530. In some implementations, after an N-number of samples of gesture data has been collected, gesture features $G_j$ can be derived. For example, gesture features for each gesture type G determined in Step 530 may be expressed by:

$$G_{j,A} = \{\vec{T_i}\}, \text{ where } j \text{ represents the gesture type,}$$

G represents gestures of swipe-up, swipe-down, swipe-left, swipe-right, and tap, and $$\vec{T} = (t_i, x_i, y_i, p_i, s_i), \forall i = 1:N$$

In the touch feature $\vec{T}$, coordinates "x" and "y" represent a pixel location on a touch screen where the sample gesture is captured, "p" represents a pressure or force applied to the touch screen while the sample gesture is captured, "s" represents a size/area of contact on the touch screen while the sample gesture is captured, and "t" represents a time at which the sample gesture was captured. The touch feature $\vec{T}$ can be calculated for each of the N-number of samples.

Step 550 includes creating representations of each of the gesture features $G_j$ derived in Step 540 by extracting sub features $f$. In some implementations, extracting sub features $f$ for each derived gesture feature $G_j$ includes an extraction function $f(G_{j,A}) = f_j$. For example, an extraction function $f$ of a swipe-down gesture $G_{Sd}$ can yield features $f_{Sd}$. For each derived gesture feature $G_{Su}$, $G_{Sd}$, $G_{Sr}$, $G_{Sl}$, and $G_T$, a corresponding sub feature $f_{Su}$, $f_{Sd}$, $f_{Sr}$, $f_{Sl}$, and $f_T$ can be extracted.

Step 560 includes training a classifier $C_G$ for each gesture type G. After capturing, collecting, and storing an N-number of samples of each gesture type G, a classifier $C_G$ can be trained for each gesture type G using the N-number of samples. For example, for the gesture types swipe-up Su, swipe-down Sd, swipe-right Sr, swipe left Sl, and tap T, determined in Step 530, classifiers $C_1$, $C_2$, $C_3$, $C_4$, and $C_5$ can be trained. Here, $C_1$ corresponds to swipe-up Su gesture, $C_2$ corresponds to swipe-down Sd gesture, $C_3$ corresponds to swipe-right Sr gesture, $C_4$ corresponds to swipe left Sl gesture, and $C_5$ corresponds to tap T gesture.

Step 570 includes obtaining a best gesture pattern for each classifier trained in Step 560. In some implementations, based upon the performance of the individual classifiers $C_G$, a best gesture pattern can be obtained. For example, as FIG. 4 depicts, classifiers $C_1$, $C_3$, and $C_5$ indicate that the user providing the gesture data in Step 520 has a best performance using the swipe-up Su gesture, the swipe-right Sr gesture, and the tap T gesture.

In some implementations, a method can be used to determine whether the classifiers trained in Step 560 represent the best performance for the user providing the gesture data in Step 520. For example, a max voting method can be used in which at least two of three gestures should agree for determining that the three gestures establish a best performance of the classifiers $C_G$.

Step 580 includes generating an enrollment template associated with the user who provided the gesture data. In some implementations, an enrollment template includes the trained classifiers $C_G$ that provided for the best gesture pattern. For example, for the classifiers $C_1$, $C_3$, and $C_5$ depicted in FIG. 4, an enrollment template can comprise:

$$Enr = \{C_1, C_3, C_5, (1,3,5)\},$$

where 1, 3, and 5 represent a swipe-up gesture Su, a swipe-right gesture Sr, and a tap gesture T, respectively.

At Step 580, the enrollment template is stored for use in authenticating an identity of a user of the kiosk device.

Figure 6:
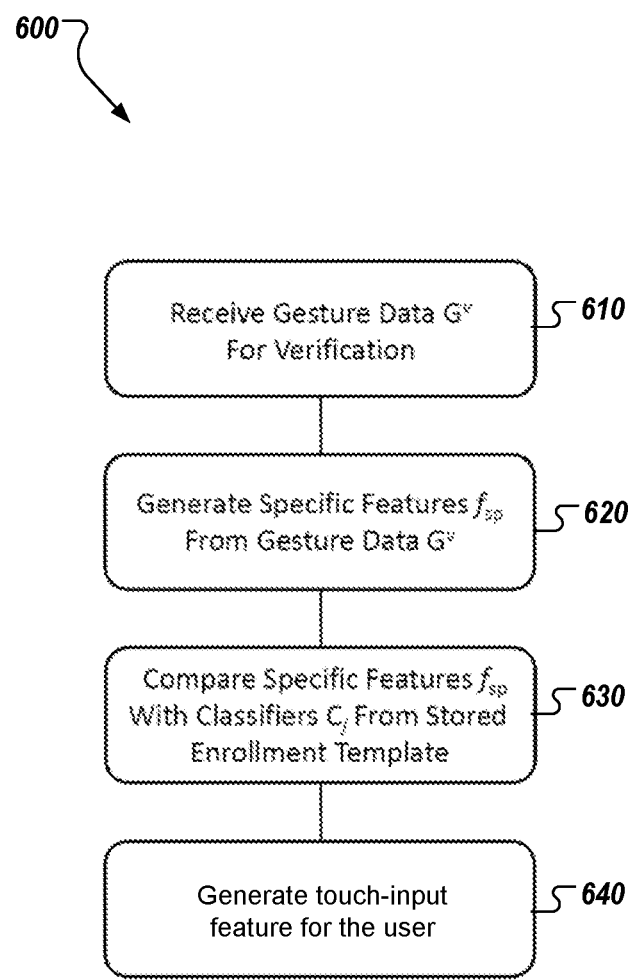
FIG. 6 depicts an exemplary method that can be used to generate a touch input feature for a user.

FIG. 6 depicts an exemplary method 600 that can be used to generate a touch input feature for a user. In FIG. 6, a touch input feature for an individual may be generated based on comparing specific gesture features with classifiers associated with a stored enrollment template, such as the enrollment template depicted in FIGS. 4 and 5. For example, Step 610 includes receiving verification samples $G_{jA}^v$ (gesture data $G^v$ for verification). In particular, gesture data $G^v$ for verification can be received from an individual interacting with a kiosk device.

Step 620 includes generating a specific gesture feature $f_{sp}^v$ for verification from the gesture data $G^v$ for verification received during Step 610. For example, the specific gesture feature $f_{sp}^v$ for verification may be generated from the gesture data $G^v$ for verification using steps depicted in the enrollment system depicted in FIG. 4 and the enrollment system depicted in FIG. 5.

The verification samples $G_{jA}^v$ (gesture data $G^v$ for verification) can be used to calculate specific gesture features $f_{sp}^v$ for verification. For example, for the enrollment system and enrollment method depicted in FIGS. 4 and 5, example specific features can be $f_1^v$, $f_3^v$, $f_5^v$, which can be based on a gesture pattern stored in a corresponding enrollment template. Here, $f_1^v$ corresponds to gesture features associated with a swipe-up Su gesture for verification, $f_3^v$ corresponds to gesture features associated with a swipe-right Sr gesture for verification, and $f_5^v$ corresponds to gesture features associated with a tap T gesture.

Step 630 includes comparing the specific gesture features $f_{sp}^v$ generated at Step 620 with classifiers $C_j$ from a stored enrollment template. In some instances, a distance is determined of a particular specific gesture feature $f_j^v$ from a particular classifier $C_j$. For example, for the enrollment system and enrollment method depicted in FIGS. 4 and 5, a distance can be determined of the swipe-up Su gesture data used for verification from the classifier $C_j$ stored for the user's enrollment template. If this distance is less than a threshold value "t," then the swipe-up Su gesture data used for verification can be considered to correspond to a value of True. For the particular specific feature $f_3^v$, a distance can be determined of the swipe-right Sr gesture data used for verification from the classifier $C_3$ stored for the user's enrollment template. If this distance is less than a threshold value "t," then the swipe-right Sr gesture data used for verification can be considered to correspond to a value of True. For the particular specific feature $f_5^v$, a distance can be determined of the tap T gesture data used for verification from the classifier $C_5$ stored for the user's enrollment template. If this distance is less than a threshold value "t," then the tap T gesture data used for verification can be considered to correspond to a value of True.

Step 640 includes generating a touch-input feature for the user based on the comparison(s) performed in Step 630. For example, in some implementations, the touch-input feature for the user is a Boolean True or False value. For example, the touch-input feature for the user can be determined to be True in the example of FIGS. 4 and 5 when at least two of the three particular specific gesture features used for verification $f_1^v, f_3^v, f_5^v$ are determined to be True (based on the comparisons in Step 630), via a max-voting rule. In some implementations, the touch-input feature for the user is based on the distance(s) determined in Step 630. Each distance determined in step 630 can represent how close a particular gesture in a gesture pattern used for verification is to corresponding gesture data in an enrollment template. In some implementations, a distance represents a percentage of match. The touch-input feature can be an aggregation of the distances determined in Step 630. For instance, the touch-input feature can be an average of the distances determined in Step 630. As another example, the touch-input feature can be set to the distance that represents the worst match among the calculated distances. For instance, if distances for respective gesture features used for verification are 80%, 90%, and 95% matches, the touch-input feature for the user can be set to be 80% (e.g., the lowest match percentage).

In some implementations, variance in the gesture sample $G_j$ can be relatively large. For example, an individual can perform a simple gesture, such as a swipe-up gesture, differently based on multiple factors. For example, posture and environment factors can affect an individual's interaction with a kiosk device. To create a robust passive authentication system based on touch-motion data, classifiers $C_j$ can be updated for a user, after a user has been verified, to reflect a user's typical gesturing behavior as manifested over multiple (and/or recent) interactions with kiosk devices.

Although certain types of processing of certain type of gestures have been described, other touch-input characteristics can be used, for comparison of a user's current gestures to reference data for the user. For example, a user may have a left hand or a right hand use dominance or percentage. A way of forming certain characters can be classified for the user. The user may tend to move from one input section to another in a particular time pattern. The user may use different amounts of pressure for certain types of inputs. The user may tend to wait a certain amount of time between gestures, or between certain types of inputs. The user may tend to use certain fingers, or a certain number of fingers (one vs two, for example), for certain types of inputs. In general, a user's manner of interacting with a kiosk touch screen may be as unique to the user as a user's handwriting, and comparing current gesture characteristics for a current user with reference data of a candidate user can indicate whether the current user is likely the same user as the candidate user.

Figure 7:
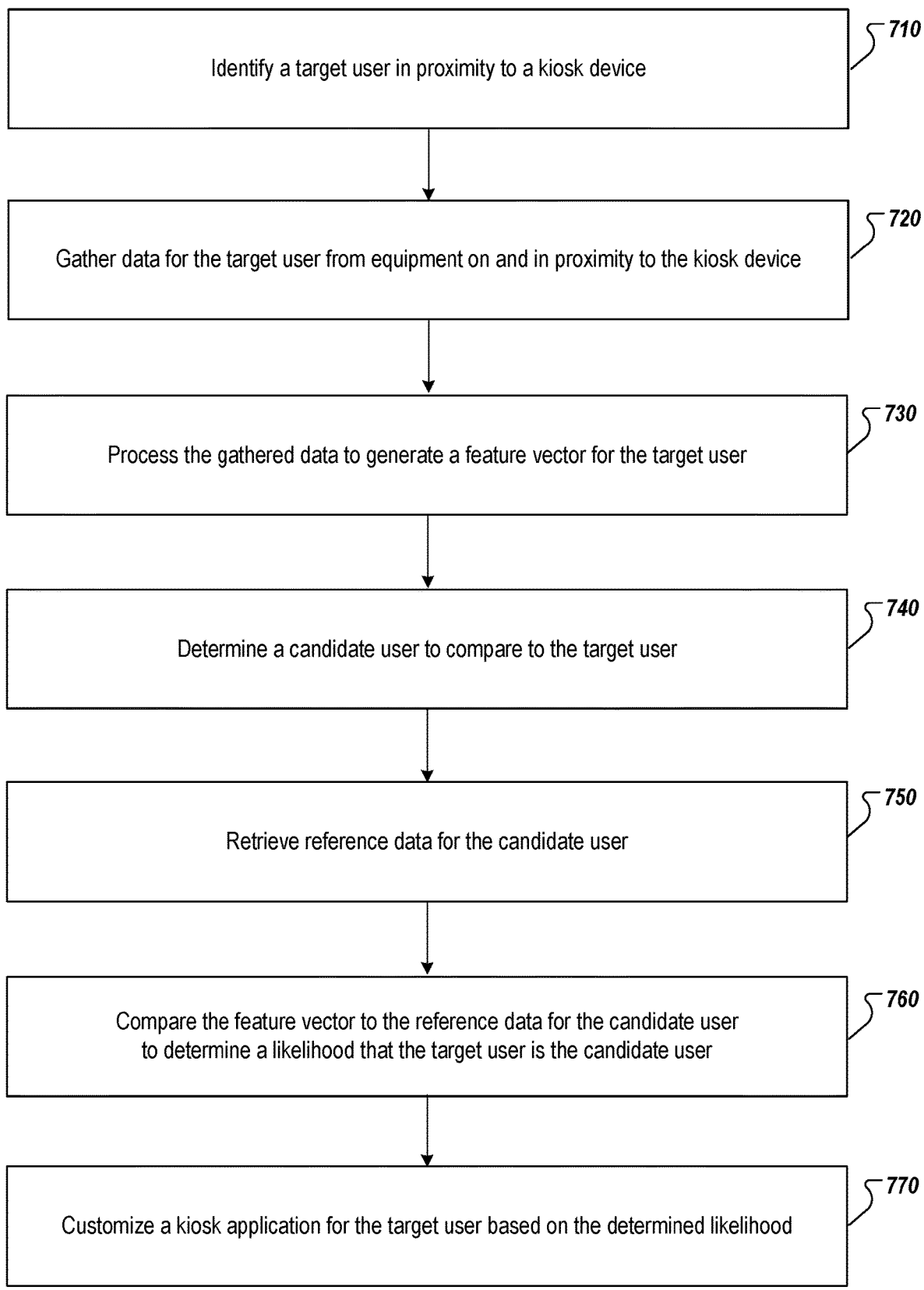
FIG. 7 is a flowchart of an example process employed within a biometric authentication system.

FIG. 7 depict a flow diagrams of example processes 700 that can be employed within a biometric authentication system deployed on a kiosk device, such as kiosk 101 of FIG. 1, for authenticating a user at the kiosk device. For clarity of presentation, the description that follows generally describes process 700 in the context of FIGS. 1, 2, 3, 4, 5, and 6. However, it will be understood that processes 700 may be performed, for example, by any other suitable system, environment, software, and hardware, or a combination of systems, environments, software, and hardware as appropriate. In some implementations, various steps of the processes 700 can be run in parallel, in combination, in loops, or in any order.

At 710, a target user in proximity to a kiosk is identified.

At 720, data for the target user is gathered from equipment on and in proximity to the kiosk.

At 730, the gathered data is processed to generate a feature vector for the target user. The feature vector includes at least motion characteristics of the target user as the target user approaches the kiosk and touch input characteristics of the target user at the kiosk.

At 740, a candidate user to compare to the target user is determined.

At 750, reference data for the candidate user is retrieved.

At 760, the feature vector is comparted to the reference data for the candidate user to determine a likelihood that the target user is the candidate user.

At 770, a kiosk application for the target user is customized based on the determined likelihood.

Figure 8:
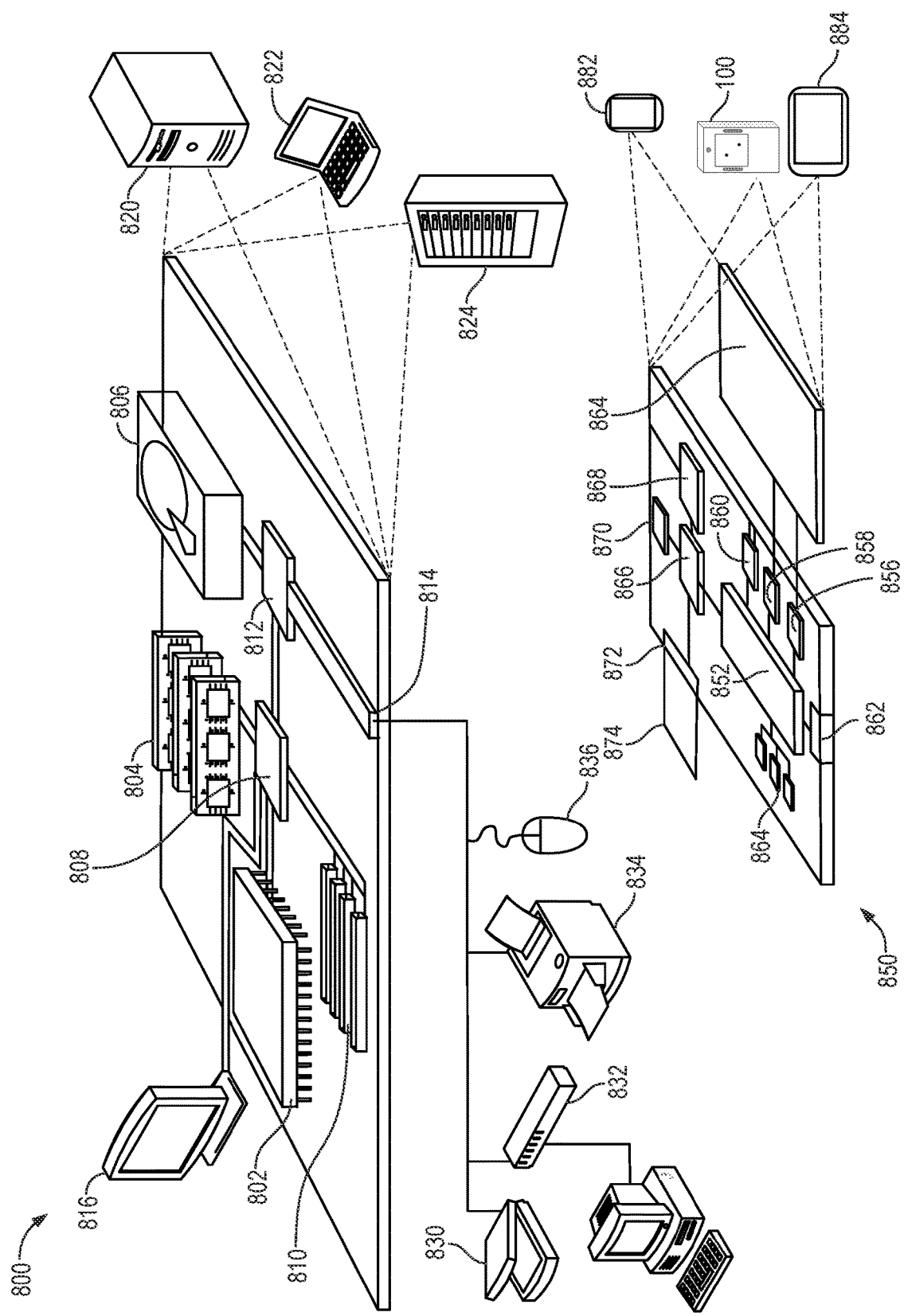
FIG. 8 is a block diagram representing examples of computing devices.

FIG. 8 shows an example of a computing device 800 and a mobile computing device 850 that are employed to execute implementations of the present disclosure. The computing device 800 is intended to represent various forms of digital computers, such as laptops, desktops, workstations, personal digital assistants, servers, blade servers, mainframes, and other appropriate computers. The mobile computing device 850 is intended to represent various forms of mobile devices, such as personal digital assistants, cellular telephones, smart-phones, AR devices, and other similar computing devices. The components shown here, their connections and relationships, and their functions, are meant to be examples only, and are not meant to be limiting.

The computing device 800 includes a processor 802, a memory 804, a storage device 806, a high-speed interface 808, and a low-speed interface 812. In some implementations, the high-speed interface 808 connects to the memory 804 and multiple high-speed expansion ports 810. In some implementations, the low-speed interface 812 connects to a low-speed expansion port 814 and the storage device 806. Each of the processor 802, the memory 804, the storage device 806, the high-speed interface 808, the high-speed expansion ports 810, and the low-speed interface 812, are interconnected using various buses, and may be mounted on a common motherboard or in other manners as appropriate. The processor 802 can process instructions for execution within the computing device 800, including instructions stored in the memory 804 and/or on the storage device 806 to display graphical information for a graphical user interface (GUI) on an external input/output device, such as a display 816 coupled to the high-speed interface 808. In other implementations, multiple processors and/or multiple buses may be used, as appropriate, along with multiple memories and types of memory. In addition, multiple computing devices may be connected, with each device providing portions of the necessary operations (e.g., as a server bank, a group of blade servers, or a multi-processor system).

The memory 804 stores information within the computing device 800. In some implementations, the memory 804 is a volatile memory unit or units. In some implementations, the memory 804 is a non-volatile memory unit or units. The memory 804 may also be another form of a computer-readable medium, such as a magnetic or optical disk.

The storage device 806 is capable of providing mass storage for the computing device 800. In some implementations, the storage device 806 may be or include a computer-readable medium, such as a floppy disk device, a hard disk device, an optical disk device, a tape device, a flash memory, or other similar solid-state memory device, or an array of devices, including devices in a storage area network or other configurations. Instructions can be stored in an information carrier. The instructions, when executed by one or more processing devices, such as processor 802, perform one or more methods, such as those described above. The instructions can also be stored by one or more storage devices, such as computer-readable or machine-readable mediums, such as the memory 804, the storage device 806, or memory on the processor 802.

The high-speed interface 808 manages bandwidth-intensive operations for the computing device 800, while the low-speed interface 812 manages lower bandwidth-intensive operations. Such allocation of functions is an example only. In some implementations, the high-speed interface 808 is coupled to the memory 804, the display 816 (e.g., through a graphics processor or accelerator), and to the high-speed expansion ports 810, which may accept various expansion cards. In the implementation, the low-speed interface 812 is coupled to the storage device 806 and the low-speed expansion port 814. The low-speed expansion port 814, which may include various communication ports (e.g., USB, Bluetooth, Ethernet, wireless Ethernet) may be coupled to one or more input/output devices. Such input/output devices may include a scanner 830, a printing device 834, or a keyboard or mouse 836. The input/output devices may also be coupled to the low-speed expansion port 814 through a network adapter. Such network input/output devices may include, for example, a switch or router 832.

The computing device 800 may be implemented in a number of different forms, as shown in the FIG. 8. For example, it may be implemented as a standard server 820, or multiple times in a group of such servers. In addition, it may be implemented in a personal computer such as a laptop computer 822. It may also be implemented as part of a rack server system 824. Alternatively, components from the computing device 800 may be combined with other components in a mobile device, such as a mobile computing device 850. Each of such devices may contain one or more of the computing device 800 and the mobile computing device 850, and an entire system may be made up of multiple computing devices communicating with each other.

The mobile computing device 850 includes a processor 852; a memory 864; an input/output device, such as a display 854; a communication interface 866; and a transceiver 868; among other components. The mobile computing device 850 may also be provided with a storage device, such as a micro-drive or other device, to provide additional storage. Each of the processor 852, the memory 864, the display 854, the communication interface 866, and the transceiver 868, are interconnected using various buses, and several of the components may be mounted on a common motherboard or in other manners as appropriate. In some implementations, the mobile computing device 850 may include a camera device(s) (not shown).

The processor 852 can execute instructions within the mobile computing device 850, including instructions stored in the memory 864. The processor 852 may be implemented as a chipset of chips that include separate and multiple analog and digital processors. For example, the processor 852 may be a Complex Instruction Set Computers (CISC) processor, a Reduced Instruction Set Computer (RISC) processor, or a Minimal Instruction Set Computer (MISC) processor. The processor 852 may provide, for example, for coordination of the other components of the mobile computing device 850, such as control of user interfaces (UIs), applications run by the mobile computing device 850, and/or wireless communication by the mobile computing device 850.

The processor 852 may communicate with a user through a control interface 858 and a display interface 856 coupled to the display 854. The display 854 may be, for example, a Thin-Film-Transistor Liquid Crystal Display (TFT) display, an Organic Light Emitting Diode (OLED) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may provide communication with the processor 852, so as to enable near area communication of the mobile computing device 850 with other devices. The external interface 862 may provide, for example, for wired communication in some implementations, or for wireless communication in other implementations, and multiple interfaces may also be used.

The memory 864 stores information within the mobile computing device 850. The memory 864 can be implemented as one or more of a computer-readable medium or media, a volatile memory unit or units, or a non-volatile memory unit or units. An expansion memory 874 may also be provided and connected to the mobile computing device 850 through an expansion interface 872, which may include, for example, a Single in Line Memory Module (SIMM) card interface. The expansion memory 874 may provide extra storage space for the mobile computing device 850, or may also store applications or other information for the mobile computing device 850. Specifically, the expansion memory 874 may include instructions to carry out or supplement the processes described above, and may include secure information also. Thus, for example, the expansion memory 874 may be provided as a security module for the mobile computing device 850, and may be programmed with instructions that permit secure use of the mobile computing device 850. In addition, secure applications may be provided via the SIMM cards, along with additional information, such as placing identifying information on the SIMM card in a non-hackable manner.

The memory may include, for example, flash memory and/or non-volatile random access memory (NVRAM), as discussed below. In some implementations, instructions are stored in an information carrier. The instructions, when executed by one or more processing devices, such as processor 852, perform one or more methods, such as those described above. The instructions can also be stored by one or more storage devices, such as one or more computer-readable or machine-readable mediums, such as the memory 864, the expansion memory 874, or memory on the processor 852. In some implementations, the instructions can be received in a propagated signal, such as, over the transceiver 868 or the external interface 862.

The mobile computing device 850 may communicate wirelessly through the communication interface 866, which may include digital signal processing circuitry where necessary. The communication interface 866 may provide for communications under various modes or protocols, such as Global System for Mobile communications (GSM) voice calls, Short Message Service (SMS), Enhanced Messaging Service (EMS), Multimedia Messaging Service (MMS) messaging, code division multiple access (CDMA), time division multiple access (TDMA), Personal Digital Cellular (PDC), Wideband Code Division Multiple Access (WCDMA), CDMA2000, General Packet Radio Service (GPRS). Such communication may occur, for example, through the transceiver 868 using a radio frequency. In addition, short-range communication, such as using a Bluetooth or Wi-Fi, may occur. In addition, a Global Positioning System (GPS) receiver module 870 may provide additional navigation- and location-related wireless data to the mobile computing device 850, which may be used as appropriate by applications running on the mobile computing device 850.

The mobile computing device 850 may also communicate audibly using an audio codec 860, which may receive spoken information from a user and convert it to usable digital information. The audio codec 860 may likewise generate audible sound for a user, such as through a speaker, e.g., in a handset of the mobile computing device 850. Such sound may include sound from voice telephone calls, may include recorded sound (e.g., voice messages, music files, etc.) and may also include sound generated by applications operating on the mobile computing device 850.

The mobile computing device 850 may be implemented in a number of different forms, as shown in FIG. 8. For example, it may be implemented the kiosk 101 described in FIG. 1. Other implementations may include a mobile device 882 and a tablet device 884. The mobile computing device 850 may also be implemented as a component of a smartphone, personal digital assistant, AR device, or other similar mobile device.

Computing device 800 and/or 850 can also include USB flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which may be for a special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural, object-oriented, assembly, and/or machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a cathode ray tube (CRT) or liquid crystal display (LCD) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a GUI or a web browser through which a user can interact with an implementation of the systems and techniques described here), or any combination of such back end, middleware, or front end components. The components of the system can be interconnected by any form or medium of digital data communication, such as network 110 of FIG. 1. Examples of communication networks include a LAN, a WAN, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method for authenticating biometric data of a user at a device using a feature vector, the method being executed by one or more processors and comprising:

identifying a target user based on at least one of being in view of a camera system of the device or an interaction with the device;

detecting, a wireless signal, by equipment capable of proximity sensing the wireless signal that passed through the target user, a wireless signal that deflected off the target user, and a wireless signal that both passed through and deflected off the target user, wherein the equipment transmits an identifier;
processing the wireless signal to identify a unique effect of the target user on the wireless signal and generate the feature vector for the target user, the feature vector based on the unique effect of the target user and including at least motion characteristics of the target user as the target user is in view of or interacts with the device, wherein the unique effect of the target user creates an apparition in the wireless signal, by which each target user has a unique apparition effect and is identified by the unique apparition effect;
determining a candidate user to compare to the target user;
retrieving reference data for the candidate user;
comparing the feature vector to the reference data for the candidate user to determine a likelihood that the target user is the candidate user; and
customizing a device application for the target user based on the determined likelihood and once a target user is identified, tracking a location and a direction of travel with speed for the target user by receiving subsequent wireless signals.

2. The computer-implemented method of claim 1, wherein an interaction with the device includes touching and interacting with a display of the device, when the user is in view of the camera system, the interaction generating a touch-input feature to capture gesture data input, wherein the gesture data input is compared with stored reference gesture data from previous interactions of the target user via the device.

3. The computer-implemented method of claim 2, wherein touching and interacting includes at least one of a group of gestures on the display comprising: swipe-up, swipe-down, swipe-right, swipe-left, and a tap.

4. The computer-implemented method of claim 3, wherein the tap includes touch data representative of measurements of at least one of: a time in which a gesture was received, a force on the display, touch duration, and a determined direction of a touch motion.

5. The computer-implemented method of claim 4, wherein gesture characteristics of the target user are comparable with the stored reference gesture data of the candidate user to indicate whether the target user is the same as the candidate user.

6. The computer-implemented method of claim 1, wherein the camera system on the device captures a vector of multiple features for the target user and captures images of the target user including a target user's facial image and touch-input characteristics of touch gestures that the target user makes while interacting with the device, and uses captured images as an additional feature vector for the target user.

7. The computer-implemented method of claim 1, wherein touching and interacting includes gestures that represent gesture data used to generate an enrollment template as a snap-shot of a target user's unique gesturing peculiarities, wherein the target user's current gesturing patterns are compared to the enrollment template to create a feature that authenticates a target user's identity.

8. The computer-implemented method of claim 1, wherein determining the candidate user comprises identifying the candidate user based on a portion of the feature vector.

9. One or more non-transitory computer-readable storage media coupled to one or more processors and having instructions stored thereon which, when executed by the one or more processors, cause the one or more processors to perform operations for authenticating biometric data of a user at a device, using a feature vector, comprising:
identifying a target user based on at least one of being in in view of a camera system of the device or an interaction with the device;
detecting, using equipment on the device: a wireless signal, the equipment capable of proximity sensing the wireless signal that passes through a target user, a wireless signal that deflected off the target user, and a wireless signal that both passes through and deflected off the target user, wherein the equipment transmits an identifier;
processing the wireless signal to identify an effect of the target user on the wireless signal and generate the feature vector for the target user, the feature vector based on the effect of the target user and including at least motion characteristics of the target user relative to the device based on a unique effect of the target user on the wireless signal, wherein the unique effect creates an apparition in the wireless signal, by which each target user has a unique apparition effect and is identified by the unique apparition effect;
determining a candidate user to compare to the target user;
retrieving reference data for the candidate user;
comparing the feature vector to the reference data for the candidate user to determine a likelihood that the target user is the candidate user; and
customizing a device application for the target user based on a determined likelihood to identify the target user.

10. The one or more non-transitory computer-readable storage media of claim 9, wherein an interaction with the device includes touching and interacting with a display of the device, when the user is in view of the camera system, the interaction generating a touch-input feature to capture gesture data input, wherein the gesture data input is compared with stored reference gesture data from previous interactions of the target user via the device.

11. The one or more non-transitory computer-readable storage media of claim 9, touching and interacting includes at least one of a group of gestures on the display of the device comprising: swipe-up, swipe-down, swipe-right, swipe-left, and a tap.

12. The one or more non-transitory computer-readable storage media of claim 11, wherein the tap includes touch data representative of measurements of at least one of: a time in which a gesture was received, a force on the display of the device, touch duration, and a determined direction of a touch motion.

13. The one or more non-transitory computer-readable storage media of claim 12, wherein gesture characteristics of the target user are comparable with stored reference gesture data of the candidate user to indicate whether the target user is the same as the candidate user.

14. The one or more non-transitory computer-readable storage media of claim 9, wherein the camera system on the device captures a vector of multiple features for the target user and captures images of the target user including a target user's facial image and touch-input characteristics of touch gestures that the target user makes while interacting with the device, and uses captured images as an additional feature vector for the target user.

15. A system, comprising:
at least one transceiver;
a server system comprising a data store; and
a device comprising:

a one or more processors; and a computer-readable storage device coupled to the one or more processors and having instructions stored thereon which, when executed by the one or more processors, cause the one or more processors to perform operations comprising:

identifying a target user based on at least one of being in in view of a camera system of the device or an interaction with the device;

detecting, a wireless signal, by equipment capable of proximity sensing the wireless signal that passed through the target user, a wireless signal that deflected off the target user, and a wireless signal that both passed through and deflected off the target user, wherein the equipment transmits an identifier;

processing the wireless signal to identify a unique effect of the target user on the wireless signal and generate a feature vector for the target user, the feature vector based on the unique effect of the target user and including at least motion characteristics of the target user as the target user is in view of or interacts with the device, wherein the unique effect of the target user creates an apparition in the wireless signal, by which each target user has a unique apparition effect and is identified by the unique apparition effect;

determining a candidate user to compare to the target user;

retrieving reference data for the candidate user;

comparing the feature vector to the reference data for the candidate user to determine a likelihood that the target user is the candidate user; and customizing a device application for the target user based on the determined likelihood and once a target user is identified, tracking a location and a direction of travel with speed for the target user by receiving subsequent wireless signals.

16. The system of claim 15, wherein an interaction with the device includes touching and interacting with a display of the device, when the target user is in view of the camera system, the interaction generating a touch-input feature to capture gesture data input, wherein the gesture data input is compared with stored reference gesture data from previous interactions of the target user via the device.

17. The system of claim 16, wherein touching and interacting includes at least one of a group of gestures on the display comprising: swipe-up, swipe-down, swipe-right, swipe-left, and a tap.

18. The system of claim 17, wherein the tap includes touch data representative of measurements of at least one of: a time in which a gesture was received, a force on the display, touch duration, and a determined direction of a touch motion.

19. The system of claim 18, wherein gesture characteristics of the target user are comparable with the stored reference gesture data of the candidate user to indicate whether the target user is the same as the candidate user.

20. The system of claim 15, wherein the camera system on the device captures a vector of multiple features for the target user and captures images of the target user including a target user's facial image and touch-input characteristics of touch gestures that the target user makes while interacting with the device, and uses captured images as an additional feature vector for the target user.

* * * * *